(12) United States Patent
Cordes et al.

(10) Patent No.: US 8,331,665 B2
(45) Date of Patent: Dec. 11, 2012

(54) METHOD OF ELECTRONIC COLOR IMAGE SATURATION PROCESSING

(75) Inventors: Claus Nico Cordes, Eindhoven (NL);
Michiel Adriaanszoon Klompenhouwer, Eindhoven (NL);
Michel Wouter Nieuwenhuizen, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 1203 days.

(21) Appl. No.: 11/720,215

(22) PCT Filed: Nov. 30, 2005

(86) PCT No.: PCT/IB2005/053966
§ 371 (c)(1),
(2), (4) Date: May 25, 2007

(87) PCT Pub. No.: WO2006/059282
PCT Pub. Date: Jun. 8, 2006

(65) Prior Publication Data
US 2008/0013827 A1  Jan. 17, 2008

(30) Foreign Application Priority Data
Dec. 1, 2004 (EP) .................................... 04106209

(51) Int. Cl.
*G06K 9/00* (2006.01)
(52) U.S. Cl. ........................................ 382/167; 382/162
(58) Field of Classification Search .................. None
See application file for complete search history.

(56) References Cited

U.S. PATENT DOCUMENTS

| 4,685,071 | A |   | 8/1987  | Lee |
|---|---|---|---|---|
| 5,204,948 | A | * | 4/1993  | Kato ............................ 358/520 |
| 5,231,504 | A | * | 7/1993  | Magee ......................... 358/500 |
| 5,450,217 | A | * | 9/1995  | Eschbach et al. ............ 358/518 |
| 5,581,370 | A | * | 12/1996 | Fuss et al. .................... 358/447 |
| 6,034,665 | A | * | 3/2000  | Kim ............................. 345/593 |
| 6,038,339 | A | * | 3/2000  | Hubel et al. ................. 382/162 |
| 6,069,972 | A | * | 5/2000  | Durg et al. ................... 382/167 |
| 6,618,171 | B1 | * | 9/2003  | Tse et al. ..................... 358/446 |
| 7,003,174 | B2 | * | 2/2006  | Kryukov et al. ............. 382/266 |
| 7,006,251 | B2 | * | 2/2006  | Fujino ......................... 358/1.9 |
| 2002/0163525 | A1 |   | 11/2002 | Liao et al. |
| 2002/0180893 | A1 | * | 12/2002 | Nicolas et al. ............... 348/672 |

(Continued)

FOREIGN PATENT DOCUMENTS

EP      0550212 A1    7/1993

OTHER PUBLICATIONS

L. Lucchese, S.K. Mitra, Filtering color images in the xyY color space, 2000 International Conference on Image Processing, 2000, v. 3, 500-503.*

(Continued)

*Primary Examiner* — Li Liu
(74) *Attorney, Agent, or Firm* — Shimokaji & Assoc., PC (57) ABSTRACT

The novel method of electronic color image processing comprises: inputting an image; obtaining a color (A) based on colors present in at least a first part of the image; and changing a saturation correlate (S2) defined with respect to the color (A) for at least a second part of the image. This allows for better quality saturation modification on a larger number of possible input images.

24 Claims, 4 Drawing Sheets

U.S. PATENT DOCUMENTS

| | | | |
|---|---|---|---|
| 2003/0002059 A1 | 1/2003 | Zaklika et al. | |
| 2003/0140346 A1* | 7/2003 | Maa | 725/87 |
| 2004/0246267 A1* | 12/2004 | Oohara | 345/591 |
| 2005/0024508 A1* | 2/2005 | Okisu et al. | 348/254 |
| 2006/0045373 A1* | 3/2006 | Kurumisawa et al. | 382/254 |
| 2007/0223018 A1* | 9/2007 | Lammers et al. | 358/1.9 |

OTHER PUBLICATIONS

Lucchese et al: "A New Algorithm Based on Saturation and Desaturation in the XY Chromaticity Diagram for Enhancement and Rendition of Color Images"; Proceedings 2001 Intnl. Conference on Image Processing. ICIP 2001. Thessaloniki, Greece, Oct. 7-10, 2001, IEEE vol. 1 of 3, Conference 8, pp. 1077-1080, XP010563954.

Wang et al: "Image Representation Using Block Pattern Models and Its Image Processing Applications"; IEEE Transactions on Pattern Analysis and Machine Intelligence, IEEE Service Center, Los Alamitos, CA, vol. 15, No. 4, Apr. 1, 1993, pp. 321-336, XP000355504.

* cited by examiner

METHOD OF ELECTRONIC COLOR IMAGE SATURATION PROCESSING

The invention relates to a method of electronic color image saturation processing.

The invention also relates to an apparatus for processing the saturation of an electronic color image.

The invention also relates to an electronic display, an electronic storage unit, a network unit and a camera comprising the apparatus.

The invention also relates to a computer program product comprising code for the method.

The invention also relates to a specially adapted electronic image representation for use in the method. With image representation is meant something equivalent to current image signals mathematically specifying a physical, e.g. an ordered set of integer tuple pixel values, or a standardized television signal.

In prior art it is well known to change the saturation of an image. Saturation is in fact a psycho visual quantity, which is difficult to model mathematically. In the brain there are more dimensions than the classical three dimensions of practical colorimetry. E.g. there is a quantity called colorfulness, which is a "kind of saturation" but which increases with the brightness of a color: a bright red patch looks more "saturated" than it would look if less illuminated (Hunt effect). Saturation is a relatively brightness independent measure of how chromatic a color is, i.e. the brain has compensated for this.

In the remainder of this text we will use the term saturation more loosely as is common with color technologists. When they mean saturation, they mean a quantity which value (at least partly) determines in the human brain how chromatic something looks. This quantity may be specified in a number of different color spaces (the specific color space determining how accurate the perceptual influence is controlled), e.g. in the PAL television color space YUV. Because the parameter changed is not an exact mathematic representation of the actual psycho visual sensation, the term "saturation correlate" (or saturation) will be used.

A typical hue correlate defined in a color plane (such as the CIE x,y-plane drawn schematically in FIG. 1) is the so-called "dominant wavelength", which is an angle which the line through a particular color and the color space white point (for PAL standardized to be D65) makes with e.g. the x-axis.

A typical measure of saturation is the distance along the line of a color from the color space white point.

It is known from perceptual studies that people like saturated images, often even more saturated than the real image. Also, cameras have the side effect that typically colors are reduced in saturation.

Therefore e.g. television sets are equipped with a saturation control, usually used for saturation increase. This can be easily realized, since according to the definition one just has to move a color of a picture element (pixel) along the line to a greater distance from the white point.

However, these prior art saturation controls have a disadvantage that they do not work very well on many actual images, and in particular there may be clipping artifacts when a color is supposed to move beyond the gamut of a display (all colors that it can physically display).

It is desirable to provide a method and corresponding apparatus of electronic color image saturation processing which allows for improved saturation processing for an increased amount of actual image content.

This object is realized in that the method of electronic color image processing comprises:
inputting an image
obtaining a color (A) based on colors present in at least a first part of the image; and
changing a saturation correlate (S2) defined with respect to the color (A) for at least a second part of the image.

Figure 2A:
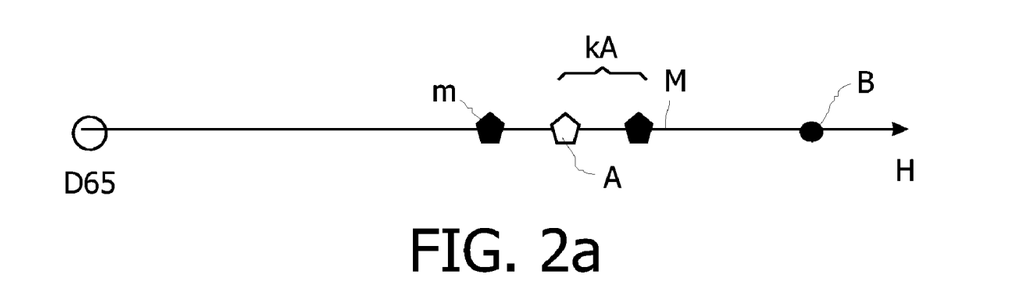
FIG. 2 schematically shows the method compared to prior art saturation increase.
Figure 2B:
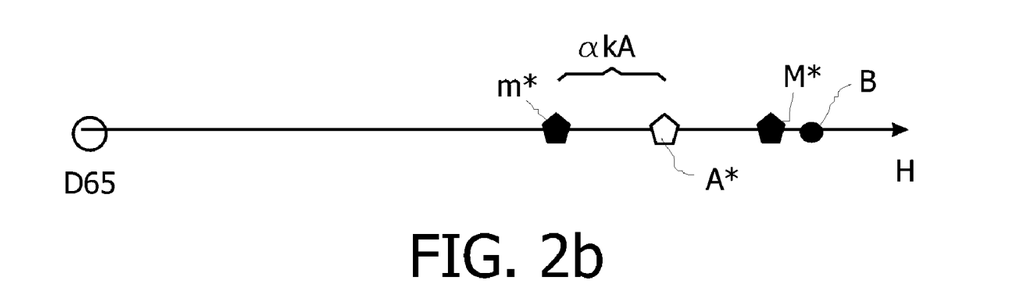
Figure 2C:
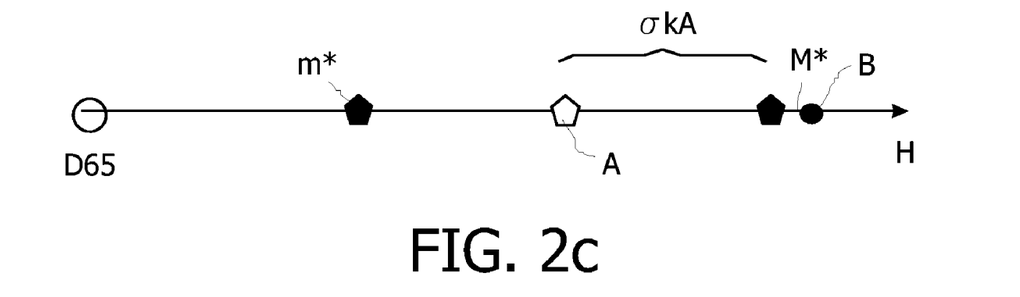

FIG. 2 upper graph symbolically shows two end points m and M of a one-dimensional cluster of colors in an input image with e.g. a specific illumination hue. Such a color image may e.g. be an outdoors scene in the reddish light of dawn. There are then at least two problems with classical saturation modification (the modification shown in the middle graph) which can be seen on this Figure. Firstly, the color of an "average" color A in the cluster changes due to the movement compared to the color space white (D65). This color may typically be a white in the scene, e.g. petals of a white flower illuminated under a reddish light. A human eye will discount the illuminant and still see the flower as white, however a camera will record it as reddish and it will be displayed to a human under conditions in which the original illuminant cannot be discounted so easily. Increasing now the saturation of all colors, will make the flower look even more reddish (as can be seen by it being closer to the maximum displayable red B). As can be seen in the lower graph showing the effect of the method according to the invention, if one first identifies in this exemplary embodiment the average color A, and then changes all saturations (i.e. the distances) with respect to A, then those colors are more saturated (the human visual system reacting to relative distances), but the average color A is left unmodified.

Secondly, when saturating colors which are already quite chromatic, with the prior art method the saturation increase has a higher chance of leading to out-of-gamut colors, which typically leads to annoying clipping artifacts (often called loss of detail, since all those saturated colors map to a single color, hence their geometrical pattern is lost). This is because the room for saturation increase left is determined by the interval between boundary color B and the saturation increased color α A, rather than with the novel method the interval between boundary color B and the unmodified color A.

In summary, with the present method the saturation modified image will correspond more to what a viewer expects.

In an embodiment of the method, the obtaining comprises identifying the color (A) as a content-adaptive white point.

As already shown above the method works particularly well when the unmodified color is a white point color, although it could be any color within the cluster. Many well-selected colors will lead to a better result than the color space white point. A white point for the content present in the image (e.g. the reddish color of the sun-light) can be identified according to different heuristic mathematical methods in literature. E.g. specular reflections on objects can be identified, in which case the set of pixels forming one or more specular reflections constitute the first part of the image. Note that the first and second part of the image may be identical (e.g. the entire image), but also different parts. E.g. for a scene of an icy landscape under a blue sky, the sky may form the first part usable for estimating the color A and the scene below it may form the second part, of which the saturation is to be modified.

In a further embodiment, the obtaining of the color A comprises calculating an average color over all pixels in the first part of the image. Averaging is also a method to derive an estimate of the scene dependent white point.

It is advantageous when the changing comprises selecting the second part of the image in dependence of lightness correlate values of picture elements.

The second part may in this case form a non-connected set of pixels in the image. Selecting pixels based on their lightness value allows application of a different saturation modification depending on how light a part of the image is, which may be especially interesting for saturation modification in darker regions.

It is further advantageous when the changing comprises selecting the second part of the image in dependence of hue correlate values of picture elements. E.g. the saturation of yellow objects can be changed differently than the saturation of blueish objects. Both options can of course be combined leading to a multidimensional color dependent saturation modification.

A multiplicative saturation modification factor used in the changing may further be dependent on a distance of a color to be saturation changed to the color, e.g. in a continuous or discrete curve, applied over domains which themselves may be selected also on the basis of saturation values, and/or other color coordinates.

In some embodiments the changing comprises selecting of the second part being a rectangular block of pixels, which is a very simple way of locally changing the saturation. E.g. an image can be scanned in 16×16 pixels blocks, the color A being the average color in the 16 by 16 block.

These embodiments can be improved when the changing comprises selecting a third part of the image being a rectangular block of pixels, and in which the changing of the saturation correlate of the third part is dependent on the changing of the saturation correlate of the second part.

To reduce any remaining small block artifacts, the saturation changes of neighboring blocks can be made dependent on each other, either by first calculating e.g. modified saturation changes making the changes in two neighboring blocks more similar, or as a post-processing. E.g. if a first block has a saturation increase $\sigma 1$ and its neighbor has a saturation increase $\sigma 2$, in case the second increase is far larger, this may be visible. This can be improved by applying respective saturation changes of $\sigma 1+k\Delta\sigma$ and $\sigma 2-k\Delta\sigma$, in which $\Delta\sigma$ is the difference in saturation increase and k a constant determined with an a priori optimized heuristic. More advanced methods may apply a saturation profile along the block, so that near the centers of the blocks different increases may be used, but on either side of a block boundary the respective central values have been changed to obtain more similar increases.

It is advantageous when the obtaining of the color (A) is further based on a fourth part of a second image. In this way a more continuous saturation change along a sequence o images may be obtained, the sequence being defined e.g. as all images within one shot of e.g. the sunrise, whereas for a next shot in e.g. a city a saturation reduction is applied. Shots may be identified on the basis of their colors, or other indicators.

It is advantageous when the changing comprises transformation to a different color space.

E.g. one can first rotate so that the color (A) becomes the [R,G,B]=[1,1,1] white color and then do a normal saturation modification, followed by an inverse rotation.

It is best if the saturation modification is performed in a color space which models human color vision more accurately than e.g. X,Y,Z, hence e.g. a transformation to CIE-Lab space may be used (which is reasonably accurate, yet still relatively calculation-easy).

The changing can also be performed in a color space defined by a luma and two chrominances.

E.g. PAL and the derived ITU-R Recommendation BT.601 standard Y' $C_R$ $C_B$, are color spaces in which inaccurate but easy saturation enhancement can be performed.

In a quality embodiment, the changing comprises applying a gain to a saturation changed color, which is dependent on a comparison of the maximal one of three R,G,B color components of the color before saturation change and the maximal one of three R,G,B color components of the saturation changed color.

The above methods can all be realized in an apparatus (typically a small calculation unit like (part of) an ASIC or a software module running on a processor in whatever physical apparatus) arranged to perform one or more of them.

An apparatus for electronic color image processing comprises:
  an input for an image;
  obtaining means arranged to obtain a color (A) based on colors present in at least a first part of the image; and
  changing means arranged to change a saturation correlate (S2) defined with respect to the color (A) for at least a second part of the image.

In further embodiments of the apparatus the obtaining means comprise identifying means arranged to identify the color (A) as a content-adaptive white point, or the changing means comprise selecting means for selecting a rectangular block of pixels being the second part.

The basic calculation apparatus is useful for being part of an electronic display (e.g. in a stand-alone television set), in which e.g. the apparatus may apply the saturation change upon a user command prior to displaying the resulting image. This is e.g. very useful for low quality portable displays in which saturation enhancement may be desirable to get an acceptable picture.

The apparatus may also be comprised in an electronic storage unit arranged to store in a memory a changed saturation image, e.g. a DVD recorder with capabilities to automatically or user-controlled change the saturation of an image, so that a more beautiful version can be stored. Another example of a storage unit is inside a camera which stores on a memory stick.

The apparatus may also be comprised in a network unit arranged to transmit over a network connection a changed saturation image, e.g. in the hardware of a television (re) distributor, or in a camera output unit connected to a cable.

A functionality of the invention may be embodied as a computer program product comprising a processor readable code to enable a processor to execute the method according to claim 1, the processor readable code comprising:
  code for obtaining a color (A) based on colors present in at least a first part of an image; and
  code for changing a saturation correlate (S2) defined with respect to the color (A) for at least a second part of the image.

It is also advantageous to have a specially adapted electronic image representation, comprising at least one specification of a color (A) as being usable in the method, and possibly further comprising data specifying a region of the image in which to apply the method and/or a saturation change parameter.

Instead of the method automatically deriving the color A, e.g. from the statistics of blocks, it then can obtain the appropriate color A for the saturation modification from the representation, e.g. a television signal.

This image representation (e.g. a signal) is a new technologically fabricated entity allowing better devices such as television displays. It may be transmitted over a network or stored in a memory.

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential.

Figure 1:
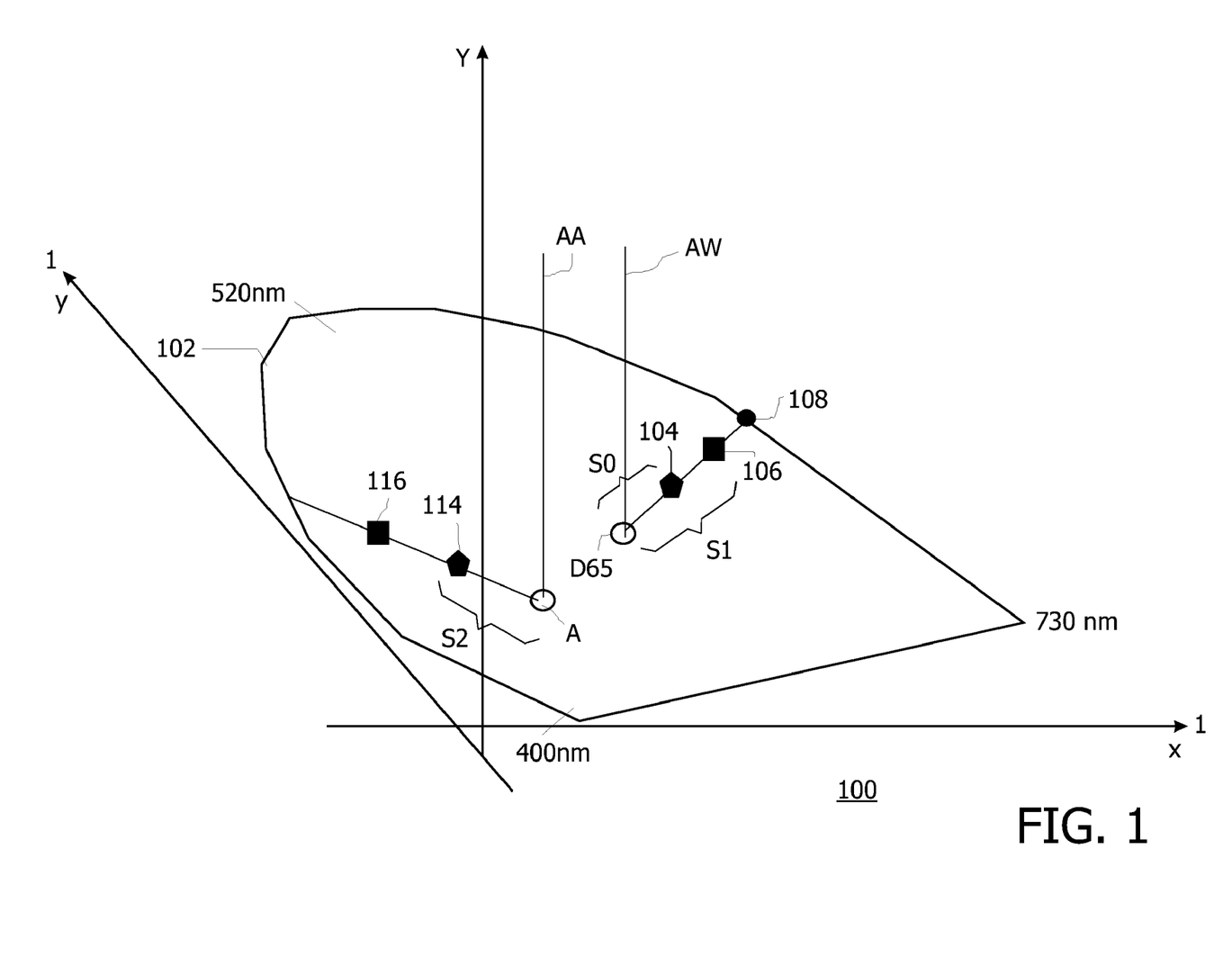
FIG. 1 schematically shows a color space based on a color plane to explain the method.

FIG. 1 schematically shows a color space being formed of a color plane (in this example CIE-x,y) and a luminance axis. In classical saturation enhancement, a color 104 is represented compared to a color space white point D65. In television color spaces this is quite easy, as the color coordinates are already specified with respect to the achromatic axis of the color space white (i.e. for grey colors U=V=0).

This defines the natural saturation S0 of that color (of e.g. a particular pixel). The saturation can now be increased to obtain a modified color 106 of an increased saturation S1. A technical saturation correlate which is sometimes used is the "purity" which is defined as the ratio of the distance S0 or S1 compared to the maximal distance between the white point D65 and a color 108 of the same technical hue on the locus of monochromatic colors (horseshoe).

The advantage of this method is that all colors look more chromatic/vivid, and the colors of greys (supposedly lying on the achromatic axis AW) are not changed, i.e. stay grey. In practice however it is seldom true that a grey is really grey. There are many scenes in which the surrounding light may color the greys in an image, e.g.:

sunlight patches of an images under sometimes very chromatic artificial light, such as thermoluminescent publicity lighting;

scenes with a majority of objects of a particular colors, such as objects under the forest canopy.

It is also often so that the content provider (the director of photography) has chosen a particular color cast for a particular effect. E.g. night scenes are emulated by reducing the lightness contrast, saturation and giving the scene a bluish color.

In the case where any of such images is received, e.g. a television displaying it after increasing the saturation will display object whites of which the color has (sometimes annoyingly) changed, as such an object white will not have the color space white color D65, but e.g. the color 104, and will hence be modified.

It is hence desirably to identify these situations.

E.g. for a part of the image being illuminated by chromatic artificial light, the method according to the invention can identify such a part (by simple heuristics on the spatiotemporal occurrence of particular color values, or with the aid of more advanced syntactic scene analysis), characterize a color A e.g. being the color of the local illumination (e.g. by averaging, or identifying highlights, etc.), and then perform the saturation change relative to this color A. This will be particularly easy for images with a global color cast, such as a dawn or forest scene.

The present method defines the saturation S2 with respect to the color A, i.e. the difference between a color 114 and the color A, and changes this saturation along the line between these two colors to obtain e.g. a modified color 116 further along the line.

FIG. 2 schematically shows a couple of advantages of the present method. A one-dimensional section through the color plane is shown, e.g. towards the hue H of color 108, here being indicated as boundary color B (although this may also be a color on the outer polygon of a display gamut projection). A simple input image situation is shown in the upper graph FIG. 2a of a scene with different object spectra being illuminated by a yellowish illuminant color A. The more yellow objects will produce color near the end M of the cluster, and the more bluish objects will produce colors near the end m.

Applying a classical saturation increase will move all colors towards the boundary. If one assumes that the original saturation spread of the cluster (i.e. the saturation of the most saturated color M) equals kA, then it can be shown that to avoid crossing the boundary of reproducible colors B, a maximum relative saturation increase of:

$$\sigma^{classical} = \frac{B - \alpha A}{kA}$$

can be achieved.

With the present new method however a larger saturation may be applied still avoiding out-of-gamut problems:

$$\sigma^{new} = \frac{B - A}{kA}.$$

Hence the present method performs better in that a perceptually much more saturated image appearance will result. Note that the * indicates the modified color.

Figure 3:
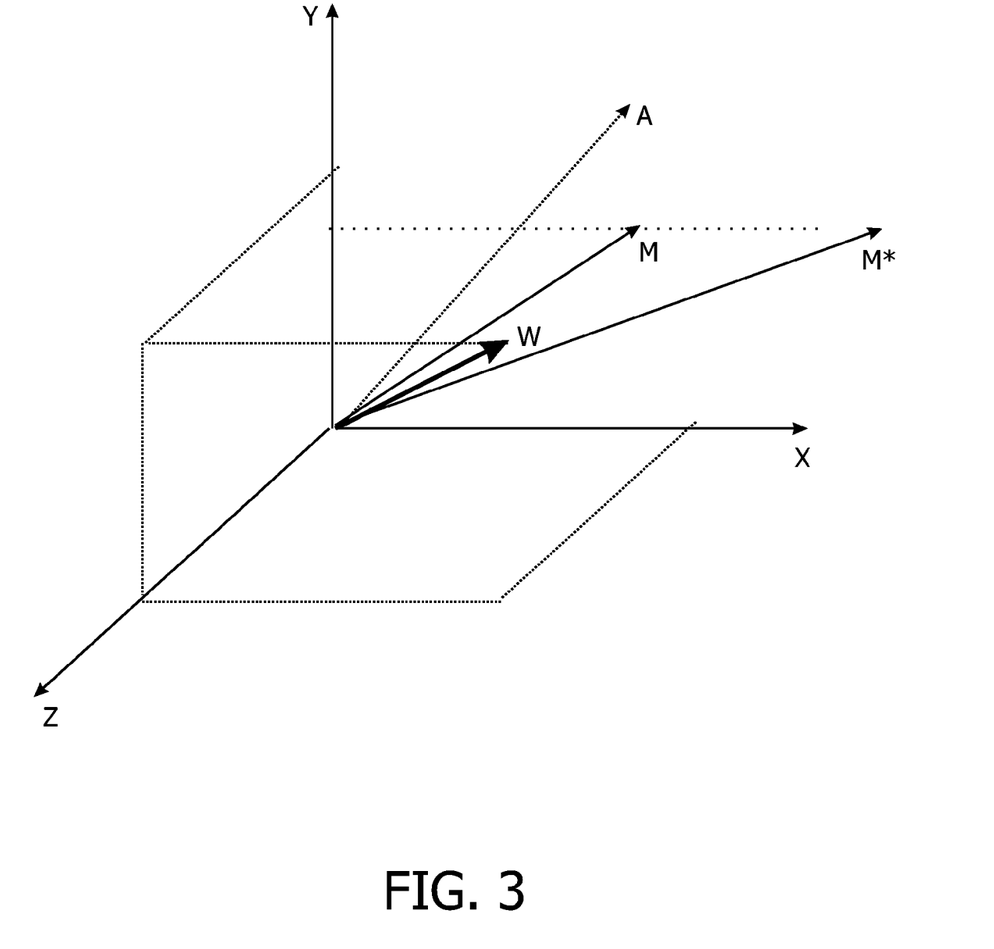
FIG. 3 schematically shows the method in a color space.

As FIG. 3 illustrates, the saturation change may also be performed directly in a color space. The saturation is the dissimilarity compared to the color A, i.e. this may be expressed by means of orthogonal distance to its vector. Since an ideal saturation change involves no change in luminance, the end points of the vectors of colors M and M* should lie in a plane orthogonal to the luminance axis Y.

It is possible to first rotate all colors with a matrix operation which maps the color A to the color space white W, then perform a saturation modification projecting the white to itself, and then inverse matrixing all colors back to towards the color A.

Figure 4:
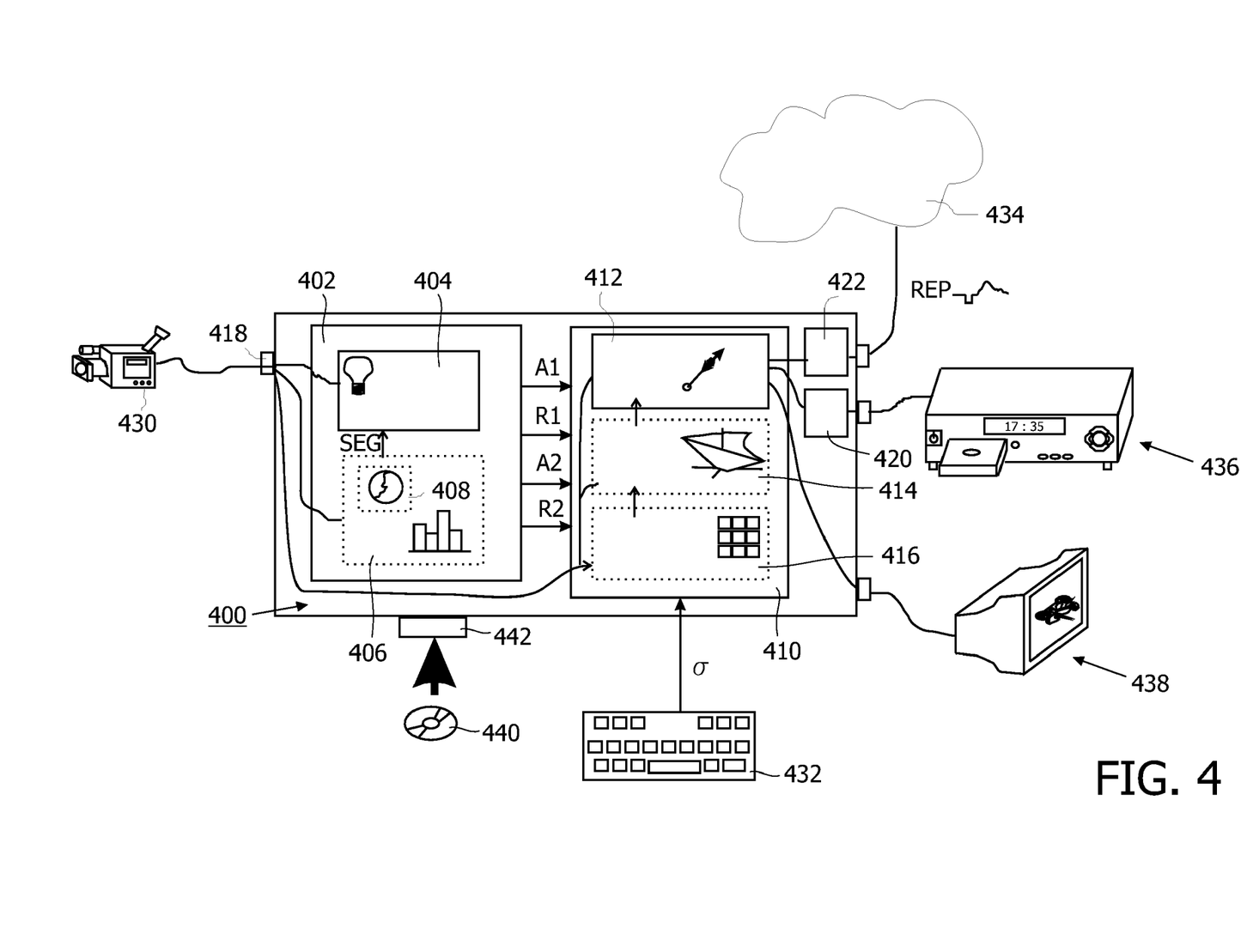
FIG. 4 symbolically shows an embodiment of the apparatus according to the invention.

FIG. 4 schematically shows an exemplary embodiment of the apparatus 400 and one of the possible configurations in a television system.

An image—e.g. from a consumer camera—can be inputted via an input 418 connected to an obtaining means arranged to obtain the color A (by reading it from the input image data, e.g. typically stored in a reserved additional field, or by deriving it itself from the image content). A color derivation means 404, which is preferably embodied as a white point identifying means, may apply e.g. an average color calculation, or a more advanced white point estimation algorithm. Or the color A may be defined with another heuristic (e.g. the blue of a sky, or the green of a military suit).

Optionally, the image may also pass through a color analysis means 406, which may be arranged to perform statistics on color coordinates such as a lightness and hue correlate. E.g. pixels may be classified in different bins. There may also be a segmentation unit 408, which may apply any known segmentation algorithm on grey and/or color data (e.g. a split-and-merge algorithm). The result is a segmentation specification, to be used with the inputted image or as a segmented image itself by the derivation means 404. E.g. the resulting segmented image (an image with an additional annotation specifying the segments) may be determined on the basis of statistical and geometrical properties: e.g. a first part of the image is determined to be a part of a coat of a human, but only those pixels of it lying within a certain lightness range. The same applies to the second part, in which the saturation is to be modified.

The output of the obtaining means is at least one color A1, and may also comprise segment identifiers R1, R2 (so that the saturation modification part need not needlessly redo a segmentation, since there are for example cases where the first part for obtaining the color and second part for modifying the saturation are disjunct, e.g. with an object and its highlights).

There is a connection for sending this information to a changing means 410 arranged to change the saturation of at least a part of the image. This is done by a saturation modification unit 412. Before going to this unit, an image may first pass a segmentation unit 410 arranged to partition the image, e.g. in blocks (but this unit may also have the full capabilities of the segmentation unit 408). The segmentation unit 410 may be arranged to couple colors A1, A2 to its segments, should they not be coupled already by the obtaining means (this functionality could also reside in the saturation modification unit 412 e.g.).

The saturation modification may be applied by the saturation modification unit 412 in the color space of the image itself (e.g. the ITU-601 color space), giving e.g.:

$$U^* = \sigma U + (1-\sigma)U_A \frac{Y}{Y_A}$$
$$V^* = \sigma V + (1-\sigma)V_A \frac{Y}{Y_A}$$
[Eqs. 1]

in which Y is the luma, and U and V are chrominances, the σ is the saturation increase or decrease (e.g. 1.4), and the index A denotes that the color coordinate is of the color A versus another pixel color if there is no index.

The saturation parameter σ may be specified by a user via user interface means 432 (e.g. a button, a graphics interface, a speech interface, . . . ), or may be derived automatically by means of heuristics specifying how a beautiful image should look.

However, it is better to perform the saturation enhancement in a more appropriate color space, preferably one which closely models human vision, such as e.g. CIE-Lab.

It is at least preferable to work in a substantially linear space by applying a gamma power function to the television signals, typically of 2.2.

Therefore, a color space transformation unit 414 may be present to transform the representation of the image or its parts prior to the saturation modification.

The result is a saturation modified output image, which may be sent to a network unit 422 for transmission over a network 434, such as the airways, the telephony network, an in-home wireless network, or just a plain cable.

The network unit 422 may comprise formatting units for conditioning the signal for transmission, such as e.g. packetization, frequency conversion, etc. As with the other units, the apparatus can be physically comprised in an apparatus called a network unit, or cooperate with a network unit, embodied in another system.

The output image may also be sent to an electronic storage unit, so that the image(s) can be stored e.g. on a hard-disk or any other storage 436.

The output image may also be outputted to a display 438.

The algorithms of any of the described methods may be loaded into the apparatus on a software carrier 440 via a reading means 442.

Since Eqs. 1 result in a visually less satisfactory saturation, more elaborate variants may be used. E.g. introduced luminance errors may be corrected by scaling with a ratio of the unprocessed and the saturation modified color.

Alternatively the correction may be applied on the basis of the maximum of the (R,G,B)-components of the unprocessed and the saturation modified color.

The algorithmic components disclosed in this text may in practice be (entirely or in part) realized as hardware (e.g. parts of an application specific IC) or as software running on a special digital signal processor, or a generic processor, etc.

Under computer program product should be understood any physical realization of a collection of commands enabling a processor—generic or special purpose—, after a series of loading steps (which may include intermediate conversion steps, like translation to an intermediate language, and a final processor language) to get the commands into the processor, to execute any of the characteristic functions of an invention. In particular, the computer program product may be realized as data on a carrier such as e.g. a disk or tape, data present in a memory, data traveling over a network connection—wired or wireless—, or program code on paper. Apart from program code, characteristic data required for the program may also be embodied as a computer program product.

Some of the steps required for the working of the method may be already present in the functionality of the processor instead of described in the computer program product, such as data input and output steps.

It should be noted that the above-mentioned embodiments illustrate rather than limit the invention. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. Method of electronic color image processing comprising:
    inputting an electronic color image;
    obtaining an average color (A) based on colors present in at least a first part of the electronic color image; and
    changing a saturation correlate (S2) defined with respect to the average color (A) for at least a second part of the electronic color image to obtain a modified color for pixels within the second part of the electronic color image, while the average color (A) of the first part of the electronic color image is left un-modified, where the saturation correlate (S2) provides different saturation among non-adjacent pixels in the at least second part of the electronic color image.

2. The method of electronic color image processing as claimed in claim 1, wherein obtaining comprises identifying the average color (A) as a content-adaptive white point.

3. The method of electronic color image processing as claimed in claim 2, wherein obtaining further comprises calculating the average color over all pixels in the first part of the image.

4. The method of electronic color image processing as claimed in claim 1, wherein changing comprises selecting the second part of the electronic color image in dependence of lightness correlate values of picture elements of the electronic color image.

5. The method of electronic color image processing as claimed in claim 1, wherein changing comprises selecting the second part of the electronic color image in dependence of hue correlate values of picture elements of the electronic color image.

6. The method of electronic color image processing as claimed in claim 1, wherein changing further comprises use of a multiplicative saturation modification factor that is dependent on a distance of (i) a color to be saturation changed to (ii) the color (A).

7. The method of electronic color image processing as claimed in claim 1, wherein changing further comprises selecting the second part to be a rectangular block of pixels of the electronic color image.

8. The method of electronic color image processing as claimed in claim 7, wherein changing further comprises selecting a third part of the electronic color image to be a rectangular block of pixels of the electronic color image, and wherein changing of the saturation correlate (S2) of the third part is dependent on the changing of the saturation correlate (S2) of the second part.

9. The method of electronic color image processing as claimed in claim 1, wherein the method is applicable for processing a set of electronic color images, and wherein obtaining of the color (A) is further based on a part of a second electronic color image of the set of electronic color images.

10. The method of electronic color image processing as claimed in claim 1, wherein changing further comprises transformation to a different color space, prior to changing the saturation correlate (S2).

11. The method of electronic color image processing as claimed in claim 1, wherein changing is performed in a color space defined by a luma and two chrominances.

12. The method of electronic color image processing as claimed in claim 1, wherein changing is performed in a substantially perceptually uniform color space.

13. The method of electronic color image processing as claimed in claim 1, wherein changing comprises applying a gain to the modified color corresponding to a saturation changed color, wherein the gain is dependent on a comparison of a maximal one of three R,G,B color components of the color of the second part of the electronic color image before saturation change and a maximal one of three R,G,B color components of the saturation changed color of the second part of the electronic color image.

14. The method of claim 1, further comprising using a specially adapted electronic image representation (REP) for at least one specification of the average color (A) as being usable in the method.

15. The method of claim 14, wherein the electronic image representation further comprises data specifying a region of the image in which to apply the method with the average color (A).

16. The method of claim 14, wherein the electronic image representation further comprises a specification of a saturation change parameter.

17. Apparatus for electronic color image processing comprising:
an input for receiving an electronic color image;
obtaining means arranged to obtain an average color (A) based on colors present in at least a first part of the electronic color image; and
changing means for changing a saturation correlate (S2) defined with respect to the average color (A) for at least a second part of the image to obtain a modified color for pixels within the second part of the electronic color image, while the average color (A) is left un-modified, where the saturation correlate (S2) provides different saturation among non-adjacent pixels in the at least a second part of the electronic color image.

18. The apparatus for electronic color image processing as claimed in claim 17, wherein the obtaining means comprises an identifying means arranged to identify the average color (A) as a content-adaptive white point.

19. The apparatus for electronic color image processing as claimed in claim 17, wherein the changing means comprises a selecting means for selecting a rectangular block of pixels of the electronic color image to be the second part.

20. The apparatus as claimed in claim 17, further comprising an electronic display arranged to display the electronic color image that includes a changed saturation image obtained via the changing means.

21. The apparatus as claimed in claim 17, further comprising an electronic storage unit arranged to store in a memory the electronic color image that includes a changed saturation image obtained via the changing means.

22. The apparatus as claimed in claim 21, wherein the electronic storage unit is a component of a still or video picture camera.

23. The apparatus as claimed in claim 17, further comprising a network unit arranged to transmit over a network connection the electronic color image that includes a changed saturation image obtained via the changing means.

24. A non-transitory computer-readable medium embodied with a computer program comprising a processor readable code to enable a processor to execute a method of electronic color image processing, the method comprising:
obtaining an average color (A) based on colors present in at least a first part of an electronic color image; and
changing a saturation correlate (S2) defined with respect to the average color (A) for at least a second part of the electronic color image to obtain a modified color for pixels within the second part of the electronic color image, while the average color (A) of the first part of the electronic color image is left un-modified, where the saturation correlate (S2) provides different saturation among non-adjacent pixels in the at least a second part of the electronic color image.

* * * * *